M. DEMONTE.
STARTING DEVICE FOR MOTOR VEHICLES AND THE LIKE.
APPLICATION FILED MAY 26, 1911.
1,028,686.
Patented June 4, 1912.
3 SHEETS—SHEET 1.
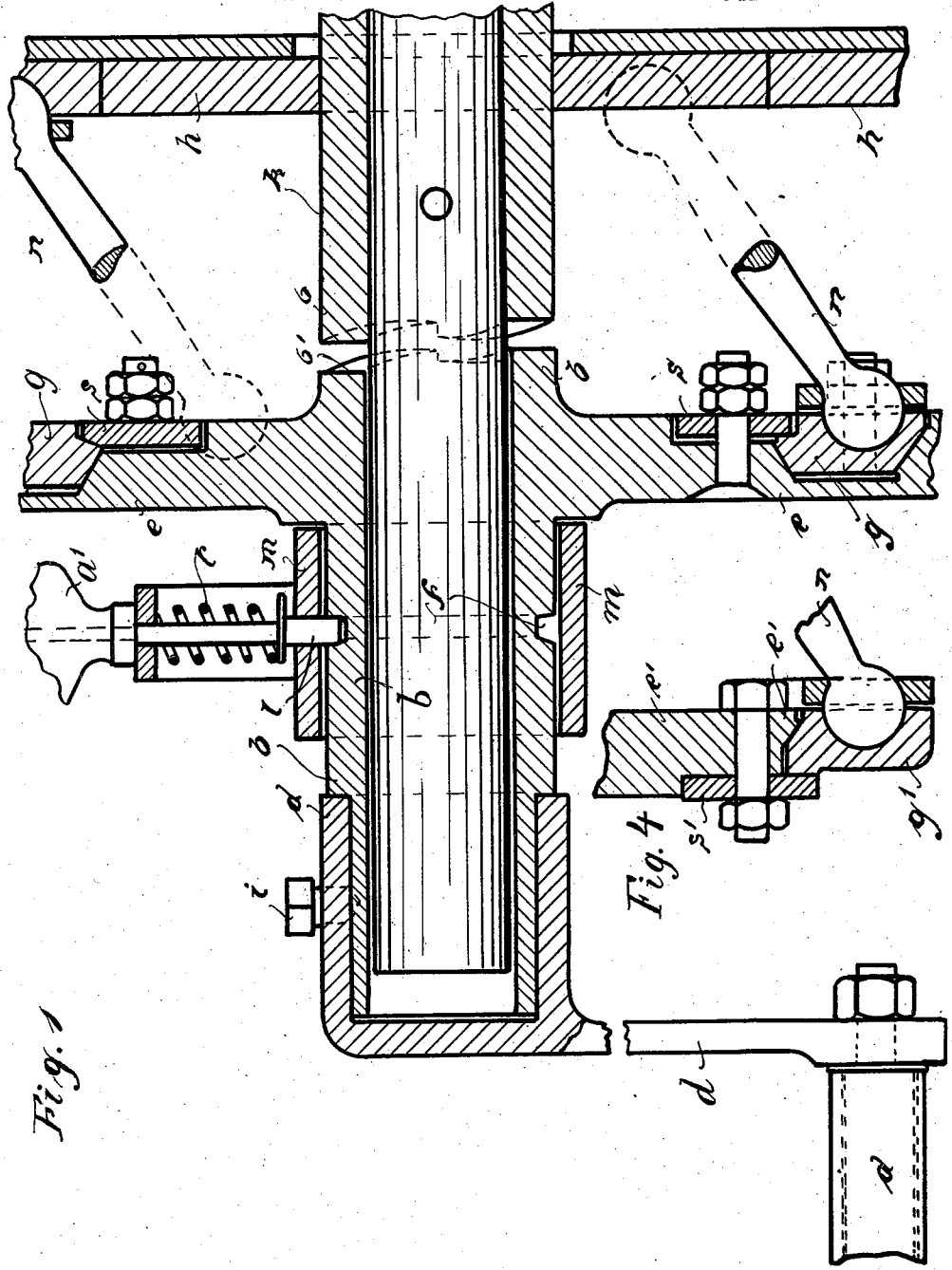
Witnesses
Inventor
Mario Demonte

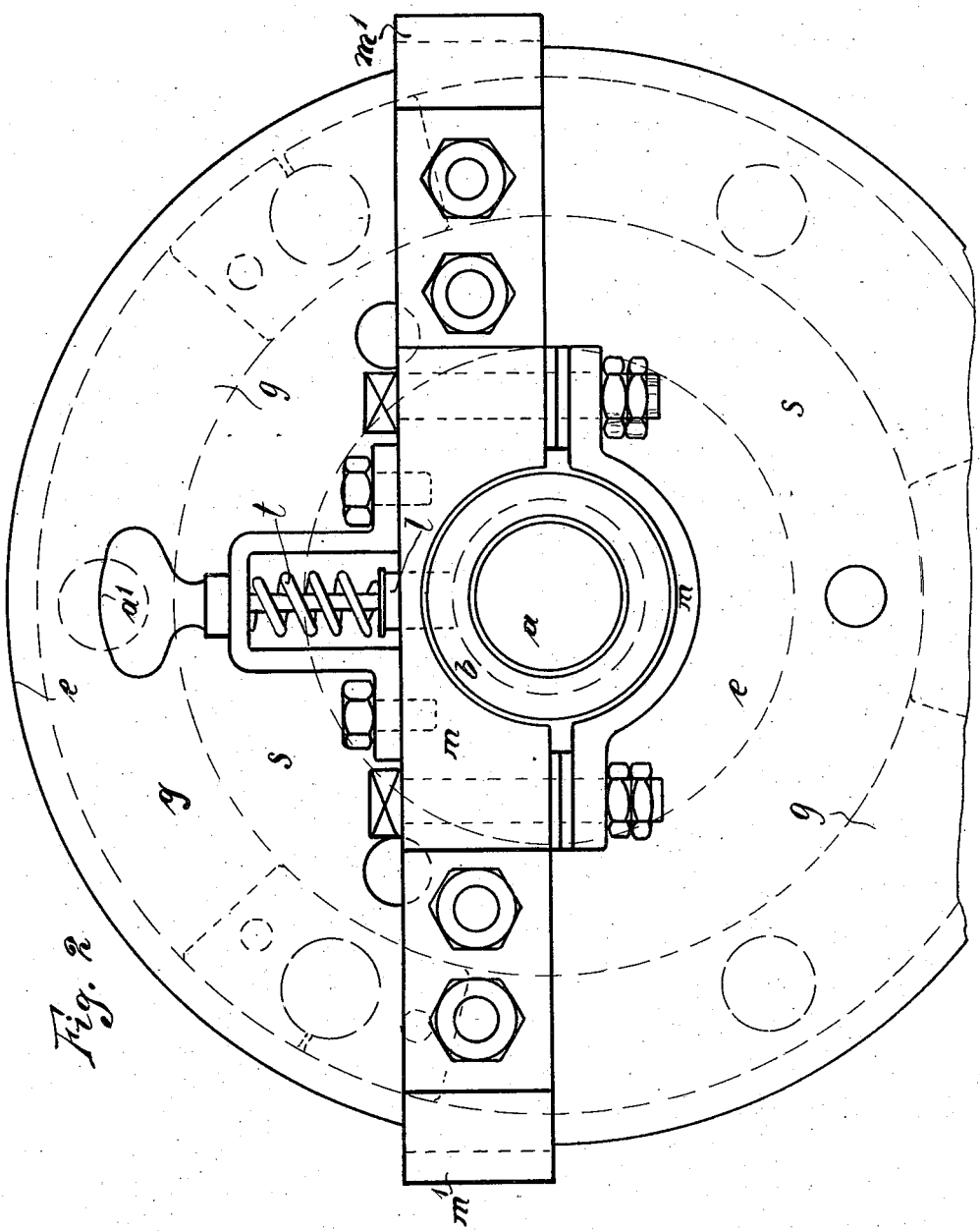

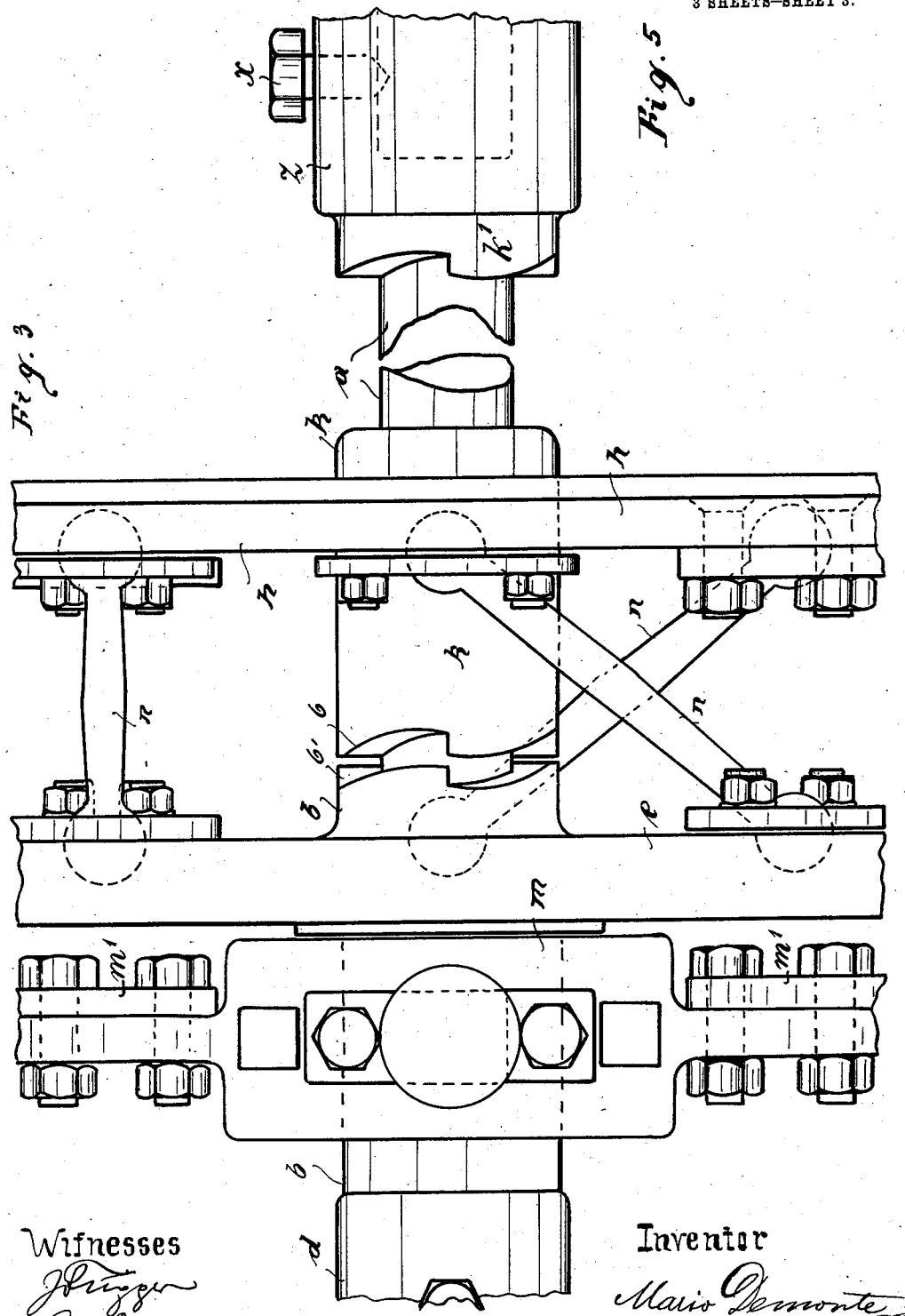

UNITED STATES PATENT OFFICE.

MARIO DEMONTE, OF GORIZIA, AUSTRIA-HUNGARY.

STARTING DEVICE FOR MOTOR-VEHICLES AND THE LIKE.

1,028,686. Specification of Letters Patent. Patented June 4, 1912.

Application filed May 26, 1911. Serial No. 629,601.

*To all whom it may concern:*

Be it known that I, MARIO DEMONTE, a subject of the Emperor of Austria-Hungary, residing at Gorizia, Austria-Hungary, have invented a certain Starting Device for Motor-Vehicles and the Like, of which the following is a specification.

The present invention relates to a starting-device for motor-vehicles and the like and consists in the combination and construction of parts as hereinafter described, the device being adapted to be brought automatically and instantaneously out of gear and so to prevent accident, should the motor happen to start backward.

In the accompanying drawings the invention is illustrated by way of example, Figure 1 representing a side view in longitudinal section of the arrangement, Fig. 2, a front view, and Fig. 3, a plan of the same. Figs. 4 and 5 show modifications of some of the details.

A sleeve $k$, which is rigidly connected to the engine shaft $a$, has at its front end a clutch-element 6. Another sleeve $b$ having a corresponding clutch-element $6^1$, is slidably fitted on the outer end of the shaft $a$ and carries the starting-handle $d$ which is secured thereto by means of set-screws $i$ or the like. Integral with the sleeve $b$ is a disk $e$ on the inner surface of which a circular groove of conical cross-section is provided, such groove being intended for the reception of a ring $g$ of a corresponding cross-section. Another ring $s$, which is rigidly secured to the disk $e$, engages a shoulder on the ring $g$ so as to retain the latter loosely in its groove.

Connected to the frame of the motor is a plate $h$ which faces the disk $e$. Between the disk $e$ and the plate $h$, three links $n$ are arranged which are connected to both elements by means of ball-and-socket joints and which normally occupy an inclined position as shown in the figures. To brackets $m^1$, secured to the plate $h$ and carried to the front side of the disk $e$, a bearing $m$ is connected for the sleeve $b$. This bearing is fitted with a slidable bolt $l$ disposed at right angles to the sleeve $b$ and normally engaging a circumferential groove $f$ on the latter. The position of the groove $f$ on the sleeve $b$ is such that, when the groove is engaged by the bolt $l$, the clutch-elements 6 and $6^1$ are out of gear. A coil-spring $t$ encircles the stem of the bolt $l$ and presses the same against the sleeve $b$. The stem of the bolt has also an actuating knob $a^1$ by means of which the bolt can be withdrawn from the groove $f$.

The *modus operandi* is as follows:— When it is desired to start the motor, the bolt $l$ is withdrawn by the left hand from its engagement with the groove $f$; at the same time the handle $d$ is turned clock-wise with the right hand. The turning of the handle causes the links $n$ to pull the disk $e$ so as to bring the clutch-elements 6 and $6^1$ into gear. As long as the shaft $a$ turns in the same direction as initiated by the handle $d$ the clutch-elements will be thus held in gear by the links, the ring $g$ turning meanwhile in its groove in the disk $e$. If, however, the motor should happen to start in the opposite direction, in which case the backward movement is transmitted by a clutch to the disk $e$ and to the elements connected thereto, then the ring $g$ will be pushed by the links $n$ into its conical groove and locked thereto, the effect being to immediately retract the sleeve $b$ on the shaft and to put the clutch out of gear. When the sleeve $b$ has been sufficiently retracted, the bolt $l$, which meanwhile has been sliding on the outer surface of the sleeve, snaps into the groove $f$ and locks the starting device in inoperative position. Owing to the wide movement made by the links $n$ when the rotation of the elements is reversed, the disengagement of the clutch is instantaneous and the risk of injury to the operator is entirely excluded.

The arrangement may be modified as shown in Fig. 4, where the ring $g^1$ for the links $n$ is rotatably fitted in a recess in the circumference of the disk $e^1$ and retained in said recess by means of a ring $s^1$ which is rigidly connected to the disk.

In Fig. 5 is shown how the same device may be adapted for connection to engine-shafts of various dimensions. The shaft $a$ is here integral with the sleeve $k^1$ and with a socket $z$ which, by means of a set-screw $x$ can be secured to the engine shaft.

I claim:—

1. A starting device for motor-vehicles and the like, comprising a sleeve loosely mounted on the end of the engine shaft, a starting handle connected to the outer end of the sleeve, a clutch element on the inner end of the sleeve, a corresponding clutch element on the engine shaft to engage therewith, a disk integral with said sleeve, a stationary plate on the motor frame facing the disk, and connections between the disk and said plate, the connections being such as to pull the disk and hold the clutch in gear as long as the shaft is rotated by the starting handle in the forward direction and to push the disk and disengage the clutch if the shaft should be rotated by the engine in the backward direction, substantially as set forth.

2. A starting device for motor-vehicles and the like, comprising a sleeve loosely arranged on the end of the engine shaft, a starting handle on the outer end of said sleeve, a clutch element on the inner end of the same, a corresponding clutch element on the engine shaft to engage therewith, a disk integral with said sleeve, a ring of conical cross-section loosely fitted in a corresponding groove in said disk, means for retaining the ring in said groove, a stationary plate on the motor frame facing the disk, and connections between the ring and the stationary plate, the connections being such as to pull the ring and hold the clutch in gear as long as the shaft is rotated by the starting handle in forward direction and to push the ring into its groove and disengage the clutch if the shaft should be rotated by the engine in backward direction, substantially as set forth.

3. A starting device for motor-vehicles and the like, comprising a sleeve loosely mounted on the end of the engine shaft, a starting handle on the outer end of the sleeve, a clutch element on the inner end of the same, a corresponding clutch element on the engine shaft to engage therewith, a disk integral with the sleeve, a ring of conical cross-section rotatably held in a groove in said disk, a stationary plate on the motor frame facing the disk, and links connected to the plate and to the disk by means of ball-and-socket joints, the links having an angular position relative to the shaft so as to pull the ring and hold the clutch in gear as long as the shaft is rotated by the starting handle in forward direction and to push the ring into its groove and disengage the clutch if the shaft should be rotated by the engine in backward direction, substantially as set forth.

4. A starting device for motor-vehicles and the like, comprising a sleeve loosely arranged on the end of the engine shaft, a starting handle on the outer end of the sleeve, a clutch element on the inner end of the same, a corresponding clutch element on the engine shaft to engage therewith, a stationary bearing for the sleeve, a spring-actuated bolt in said bearing normally engaging a circular groove in the sleeve so as to hold the clutch out of gear, means for disengaging the bolt from the groove, a disk integral with the sleeve, a stationary plate on the motor frame facing the disk, and connections between the plate and the disk, the connections being such as to pull the disk and hold the clutch in gear as long as the shaft is rotated in forward direction by the starting handle and to push the disk and disengage the clutch if the shaft should be rotated by the engine in backward direction, substantially as set forth.

MARIO DEMONTE.

Witnesses:
C. B. MAYO,
VINCENT BURES.